(12) United States Patent
Tanaka (10) Patent No.: US 10,245,734 B2
(45) Date of Patent: Apr. 2, 2019

(54) MANIPULATION SYSTEM AND CONTROL METHOD THEREOF

(71) Applicant: NSK LTD., Tokyo (JP)

(72) Inventor: Nobuaki Tanaka, Kanagawa (JP)

(73) Assignee: NSK LTD., Tokyo (JP)

(*) Notice: Subject to any disclaimer, the term of this patent is extended or adjusted under 35 U.S.C. 154(b) by 0 days.

(21) Appl. No.: 15/564,505

(22) PCT Filed: Apr. 6, 2016

(86) PCT No.: PCT/JP2016/061266
§ 371 (c)(1),
(2) Date: Oct. 5, 2017

(87) PCT Pub. No.: WO2016/163401
PCT Pub. Date: Oct. 13, 2016

(65) Prior Publication Data
US 2018/0071919 A1    Mar. 15, 2018

(30) Foreign Application Priority Data

Apr. 8, 2015 (JP) .................................. 2015-079175

(51) Int. Cl.
*B25J 7/00* (2006.01)
*B25J 9/02* (2006.01)
(Continued)

(52) U.S. Cl.
CPC ............... *B25J 13/065* (2013.01); *B25J 7/00* (2013.01); *B25J 9/023* (2013.01); *B25J 9/1682* (2013.01);
(Continued)

(58) Field of Classification Search
CPC ... B25J 7/00; B25J 9/023; B25J 9/1682; B25J 13/065; G02B 21/00; G05B 19/231; G05B 2219/45182
See application file for complete search history.

(56) References Cited

U.S. PATENT DOCUMENTS 5,677,709 A    10/1997  Miura et al.
5,886,684 A    3/1999   Miura et al.
(Continued)

FOREIGN PATENT DOCUMENTS

JP    7-001366 A    1/1995
JP    7-227783 A    8/1995
(Continued)

OTHER PUBLICATIONS

Notification of Reasons for Refusal for application No. 2017-511019 dated Aug. 22, 2017.
(Continued)

*Primary Examiner* — Khoi H Tran
*Assistant Examiner* — Robert T Nguyen
(74) *Attorney, Agent, or Firm* — Sughrue Mion, PLLC (57) ABSTRACT

A manipulation system includes: a manipulator that operates a microscopic object; a first input unit that generates a first movement command signal for moving the manipulator to a manipulator position corresponding to an input operation position; and a second input unit that generates a second movement command signal for moving the manipulator to a manipulator stored position stored in a storage. When the input operation position of the first input unit is a predetermined input operation position, the manipulator is enabled to be moved by an operation of the first input unit, or the manipulator is enabled to be moved by an operation of the second input unit.

16 Claims, 7 Drawing Sheets

(51) Int. Cl.
*B25J 9/16* (2006.01)
*B25J 13/06* (2006.01)
*G02B 21/00* (2006.01)
*G05B 19/23* (2006.01)

(52) U.S. Cl.
CPC ........... *G02B 21/00* (2013.01); *G05B 19/231* (2013.01); *G05B 2219/45182* (2013.01)

(56) References Cited

U.S. PATENT DOCUMENTS

| | | | |
|---|---|---|---|
| 5,973,471 A * | 10/1999 | Miura | B25J 7/00 |
| | | | 318/590 |
| 8,641,663 B2 * | 2/2014 | Kirschenman | A61B 17/2909 |
| | | | 604/156 |
| 9,919,424 B1 * | 3/2018 | Devengenzo | B25J 9/1656 |
| 2013/0023052 A1 | 1/2013 | Tanaka | |

FOREIGN PATENT DOCUMENTS

| | | |
|---|---|---|
| JP | 08-248325 A | 9/1996 |
| JP | 8-281584 A | 10/1996 |
| JP | 2007-030136 A | 2/2007 |
| WO | 2012/018136 A1 | 2/2012 |

OTHER PUBLICATIONS

International Search Report for PCT/JP2016/061266 dated Jun. 7, 2016 [PCT/ISA/210].
Written Opinion for PCT/JP2016/061266 dated Jun. 7, 2016 [PCT/ISA/237].

* cited by examiner

MANIPULATION SYSTEM AND CONTROL METHOD THEREOF

FIELD

CROSS-REFERENCE TO RELATED APPLICATION

This application is a National Stage of PCT international application Ser. No. PCT/JP2016/061266 filed on Apr. 6, 2016 which designates the United States, incorporated herein by reference, and which is based upon and claims the benefit of priority from Japanese Patent Application No. 2015-079175 filed on Apr. 8, 2015, the entire contents of which are incorporated herein by reference.

The present invention relates to a manipulation system and a control method thereof.

BACKGROUND

In the biotechnology field, there is known a micromanipulation system performing micromanipulation on a microscopic object such as injecting a DNA solution or a cell into a cell or an egg through observation under a microscope. Patent Document 1 described below discloses a micromanipulator for operating a capillary (microneedle) using a joystick. In addition to the operation with the joystick, it is disclosed that an operation of storing positional information of the capillary by operating a button switch is performed to move the capillary to a stored position.

CITATION LIST

Patent Document

Patent Document 1: Japanese Patent Application Laid-open No. 8-248325

SUMMARY

Technical Problem

However, in a manipulation system in which an operation of a manipulator with the joystick and an operation of the button switch for moving the manipulator to the stored position are performed, a correspondence relation may be discontinued between an input position obtained by operating the joystick and an actual position of the manipulator (a position of the capillary). Accordingly, the operation of the joystick may cause a malfunction of the manipulator.

The present invention provides a manipulation system that can reduce malfunctions of a manipulator and a control method thereof.

Solution to Problem

According to an aspect of the present invention, a manipulation system includes: a manipulator that operates a microscopic object; a first input unit that generates a first movement command signal for moving the manipulator to a manipulator position corresponding to an input operation position; and a second input unit that generates a second movement command signal for moving the manipulator to a manipulator stored position stored in a storage. When the input operation position of the first input unit is a predetermined input operation position, the manipulator is enabled to be moved by an operation of the first input unit, or the manipulator is enabled to be moved by an operation of the second input unit.

With this configuration, when the input operation position of the first input unit is the predetermined input operation position, the manipulator is enabled to be moved by the first input unit or the second input unit. Accordingly, when a correspondence relation is discontinued between the input operation position of the first input unit and the position of the manipulator, movement of the manipulator due to an operation of the first input unit or the second input unit is restricted, so that malfunctions of the manipulator can be reduced.

In the manipulation system according to the aspect of the present invention, when the input operation position of the first input unit is the predetermined input operation position, coordinates of the input operation position are caused to correspond to coordinates of the manipulator position. With this configuration, even when the correspondence relation is discontinued between the input operation position of the first input unit and the position of the manipulator, the coordinates of the input operation position of the first input unit can be caused to correspond to the coordinates of the manipulator at a predetermined position. Thus, the manipulator is moved in accordance with a displacement amount of the input operation position of the first input unit, so that malfunctions of the manipulator can be reduced.

In the manipulation system according to the aspect of the present invention, when the input operation position of the first input unit is not at the predetermined input operation position after the manipulator is moved by an operation of the second input unit, movement of the manipulator by an operation of the first input unit is restricted. With this configuration, when the manipulator is moved to the manipulator stored position by the operation of the second input unit, and the correspondence relation is discontinued between the position of the manipulator and the input operation position of the first input unit, the operation of the first input unit is restricted, so that malfunctions of the manipulator are reduced.

In the manipulation system according to the aspect of the present invention, when the input operation position of the first input unit is not at the predetermined input operation position, movement of the manipulator by an operation of the second input unit is restricted. With this configuration, movement of the manipulator to the manipulator stored position is restricted in a state in which the input operation position is not at the predetermined input operation position. This keeps the correspondence relation between the position of the manipulator and the input operation position of the first input unit from being discontinued, so that malfunctions of the manipulator are reduced.

The manipulation system according to the aspect of the present invention further includes a control device that receives the first movement command signal or the second movement command signal and outputs a drive signal for moving the manipulator. With this configuration, malfunctions of the manipulator are surely reduced.

In the manipulation system according to the aspect of the present invention, the first input unit is a joystick capable of inputting the input operation position by an operation of a handle. With this configuration, an operator can easily operate the manipulator by operating the handle of the joystick.

In the manipulation system according to the aspect of the present invention, when the input operation position is expressed in an XYZ orthogonal coordinate system, the predetermined input operation position is an origin point of the XYZ orthogonal coordinate system. With this configuration, when the operator put the handle in a neutral position, the input operation position of the handle becomes origin coordinates, so that the manipulator can be easily moved by the first input unit or the manipulator can be easily moved by the second input unit.

In the manipulation system according to the aspect of the present invention, a dead zone region is provided for the first input unit, the dead zone region being a region near the predetermined input operation position and in which the manipulator is not moved even when the input operation position is changed. With this configuration, malfunctions of the manipulator are surely reduced. By operating the first input unit to a predetermined position, the manipulator can be easily moved by the first input unit or the manipulator can be easily moved by the second input unit.

A control method of a manipulation system according to another aspect of the present invention includes a first movement step of moving a manipulator to a manipulator position corresponding to an input operation position of a first input unit based on a first movement command signal of the first input unit; a second movement step of moving the manipulator to a manipulator stored position stored in a storage based on a second movement command signal of a second input unit; and a movement operation enabling step of enabling the first movement step or the second movement step when the input operation position of the first input unit is a predetermined input operation position.

With this configuration, when the input operation position of the first input unit is a predetermined input operation position, the manipulator is enabled to be moved by the first input unit or the second input unit. Accordingly, when the correspondence relation is discontinued between the input operation position of the first input unit and the position of the manipulator, movement of the manipulator due to the operation of the first input unit or the second input unit can be restricted to reduce malfunctions of the manipulator.

In the control method of the manipulation system according to the aspect of the present invention, in the movement operation enabling step, when the input operation position of the first input unit is a predetermined input operation position, coordinates of the input operation position are caused to correspond to coordinates of the manipulator position. With this configuration, even when the correspondence relation is discontinued between the input operation position of the first input unit and the position of the manipulator, the coordinates of the input operation position of the first input unit can be caused to correspond to the coordinates of the manipulator position at the predetermined input operation position. Thus, the manipulator is enabled to be moved in accordance with a displacement amount of the input operation position of the first input unit, so that malfunctions can be reduced.

In the control method of the manipulation system according to the aspect of the present invention, when the second movement step is executed, execution of the first movement step is restricted. With this configuration, when the correspondence relation is discontinued between the position of the manipulator and the input operation position of the first input unit at the second movement step, the operation of the first input unit is restricted, so that malfunctions of the manipulator are reduced.

In the control method of the manipulation system according to the aspect of the present invention, when the input operation position of the first input unit is not the predetermined input operation position, execution of the second movement step is restricted. With this configuration, movement of the manipulator to the manipulator stored position is restricted in a state in which the input operation position is not at the predetermined input operation position. This keeps the correspondence relation between the position of the manipulator and the input operation position of the first input unit from being discontinued, so that malfunctions of the manipulator are reduced.

Advantageous Effects of Invention

According to the present invention, malfunctions of the manipulator can be reduced.

DESCRIPTION OF EMBODIMENTS

The following describes modes for carrying out the invention (embodiments) in detail with reference to the drawings. The present invention is not limited to the embodiments described below. Components described below include a component that is easily conceivable by those skilled in the art and components that are substantially the same. The components described below can be appropriately combined. Dimensions and shapes in the drawings are appropriately changed from actual dimensions and shapes for explaining the embodiments.

First Embodiment

Figure 1:
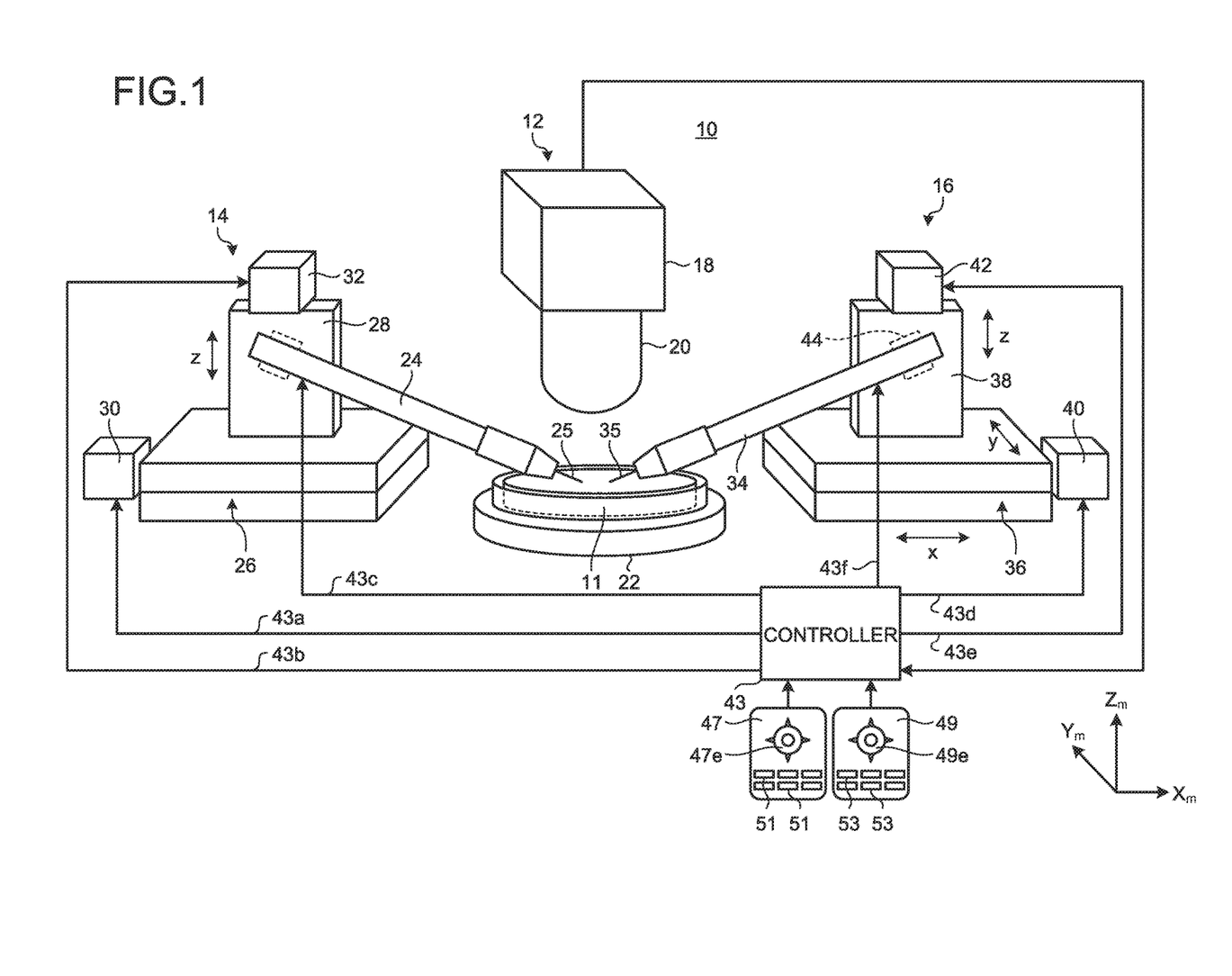
FIG. 1 is a diagram schematically illustrating a configuration of a manipulation system according to a first embodiment.

FIG. 1 is a diagram schematically illustrating a configuration of a manipulation system according to a first embodiment. A manipulation system 10 is a system for operating on a sample such as a microscopic object under observation by a microscope. In FIG. 1, the manipulation system 10 includes a microscope unit 12, a first manipulator 14, a second manipulator 16, and a controller 43 controlling the manipulation system 10. The first manipulator 14 and the second manipulator 16 are separately arranged on opposite sides of the microscope unit 12.

The microscope unit 12 includes a camera 18 including an imaging element, a microscope 20, and a sample stage 22. The sample stage 22 can support a sample holding member 11 such as a laboratory dish, and the microscope 20 is arranged immediately above the sample holding member 11. The microscope unit 12 includes the microscope 20 and the camera 18 integrated with each other, and includes a light source (not illustrated) emitting light toward the sample holding member 11. The camera 18 may be arranged separately from the microscope 20.

The sample holding member 11 contains a solution including a sample. When the sample in the sample holding member 11 is irradiated with light and the light reflected by the sample in the sample holding member 11 enters the microscope 20, an optical image related to the sample is enlarged by the microscope 20 and imaged by the camera 18. The sample can be observed based on the image taken by the camera 18.

As illustrated in FIG. 1, the first manipulator 14 includes a first pipette holding member 24, an X-Y axis table 26, a Z axis table 28, a drive device 30 driving the X-Y axis table 26, and a drive device 32 driving the Z axis table 28. The first manipulator 14 is a manipulator having a triaxial configuration of the X axis, the Y axis, and the Z axis. In the embodiment, a certain direction in a horizontal plane is assumed to be the $X_m$ axis direction, a direction intersecting with the $X_m$ axis direction in the horizontal plane is assumed to be the $Y_m$ axis direction, and a direction intersecting with each of the $X_m$ axis direction and the $Y_m$ axis direction (that is, a vertical direction) is assumed to be the $Z_m$ axis direction.

The X-Y axis table 26 can be moved in the $X_m$ axis direction or the $Y_m$ axis direction by being driven by the drive device 30. The Z axis table 28 is arranged to be movable upward and downward with the X-Y axis table 26, and can be moved in the $Z_m$ axis direction by being driven by the drive device 32. The drive devices 30 and 32 are connected to the controller 43.

The first pipette holding member 24 is coupled to the Z axis table 28, and a first capillary 25 serving as a capillary tube tip is attached to a distal end of the first pipette holding member 24. The first pipette holding member 24 moves in a three-dimensional space as a movement region in accordance with movement of the X-Y axis table 26 and the Z axis table 28, and can hold the sample contained in the sample holding member 11 via the first capillary 25. That is, the first manipulator 14 is a manipulator for holding a sample and used for holding a microscopic operation target, and the first capillary 25 is a capillary for holding the sample.

The second manipulator 16 includes a second pipette holding member 34, an X-Y axis table 36, a Z axis table 38, a drive device 40 driving the X-Y axis table 36, and a drive device 42 driving the Z axis table 38. The second manipulator 16 is a manipulator having a triaxial configuration of the X axis, the Y axis, and the Z axis.

The X-Y axis table 36 can be moved in the $X_m$ axis direction or the $Y_m$ axis direction by being driven by the drive device 40. The Z axis table 38 is arranged to be movable upward and downward with the X-Y axis table 36, and can be moved in the $Z_m$ axis direction by being driven by the drive device 42. The drive devices 40 and 42 are connected to the controller 43.

The second pipette holding member 34 is coupled to the Z axis table 38, and a second capillary 35 made of glass is attached to a distal end of the second pipette holding member 34. The second pipette holding member 34 moves in a three-dimensional space as a movement region in accordance with movement of the X-Y axis table 36 and the Z axis table 38, and human-operatable on the sample contained in the sample holding member 11. That is, the second manipulator 16 is a manipulator for operating on the sample and used for operating (for example, boring) a microscopic operation target, and the second capillary 35 is a capillary for operating on the sample.

The X-Y axis table 36 and the Z axis table 38 are configured as a coarse adjustment mechanism (three-dimensional axis movement table) that coarsely move the second pipette holding member 34 to an operation position of the sample and the like contained in the sample holding member 11. A coupling part between the Z axis table 38 and the second pipette holding member 34 includes a fine adjustment mechanism 44 serving as a nanopositioner. The fine adjustment mechanism 44 is configured to support the second pipette holding member 34 to be freely movable in an arrangement direction thereof, and to finely move the second pipette holding member 34 along a longitudinal direction (axial direction) thereof.

The fine adjustment mechanism 44 may include, for example, a roller bearing (not illustrated) that supports the second pipette holding member 34 and a piezoelectric element (not illustrated) that changes a position in the longitudinal direction of the second pipette holding member 34. The piezoelectric element expands or contracts along the longitudinal direction of the second pipette holding member 34 in accordance with an applied voltage, and can finely move the second pipette holding member 34. The configuration of the fine adjustment mechanism 44 is not limited to the configuration described above. Although the fine adjustment mechanism 44 is assumed to be arranged in the second manipulator 16 for operating on the sample, the fine adjustment mechanism 44 may also be arranged in the first manipulator 14 for holding the sample, or may be omitted.

As illustrated in FIG. 1, a first joystick 47 and a second joystick 49 serving as first input units are connected to the controller 43, and first button switches 51 and second button switches 53 serving as second input units are connected to the controller 43. In the embodiment, the first button switches 51 are provided integrally with the first joystick 47, and the second button switches 53 are provided integrally with the second joystick 49. The first joystick 47 and the first button switches 51 are input units for mainly operating the first manipulator 14, and the second joystick 49 and the second button switches 53 are input units for mainly operating the second manipulator 16.

Based on an input signal caused by an operation and the like of a handle 47e of the first joystick 47 and an input signal caused by an operation and the like of a handle 49e of the second joystick 49, the controller 43 outputs drive signals 43a, 43b, 43d, and 43e that respectively control driving of the drive devices 30, 32, 40, and 42; and drive signals 43c and 43f that drive the fine adjustment mechanisms 44.

In the embodiment, one first joystick 47 and one second joystick 49 are arranged for the first manipulator 14 and the second manipulator 16, respectively. However, the embodiment is not limited thereto. The first manipulator 14, the second manipulator 16, and the microscope unit 12 may be operated with one joystick, or various operations may be performed with three or more joysticks.

The first manipulator 14 and the second manipulator 16 have substantially the same configuration, the first joystick 47 and the second joystick 49 have substantially the same configuration, and the first button switches 51 and the second button switches 53 have substantially the same configuration. In the following description, the first manipulator 14, the first joystick 47, and the first button switches 51 are exemplified.

Figure 2:
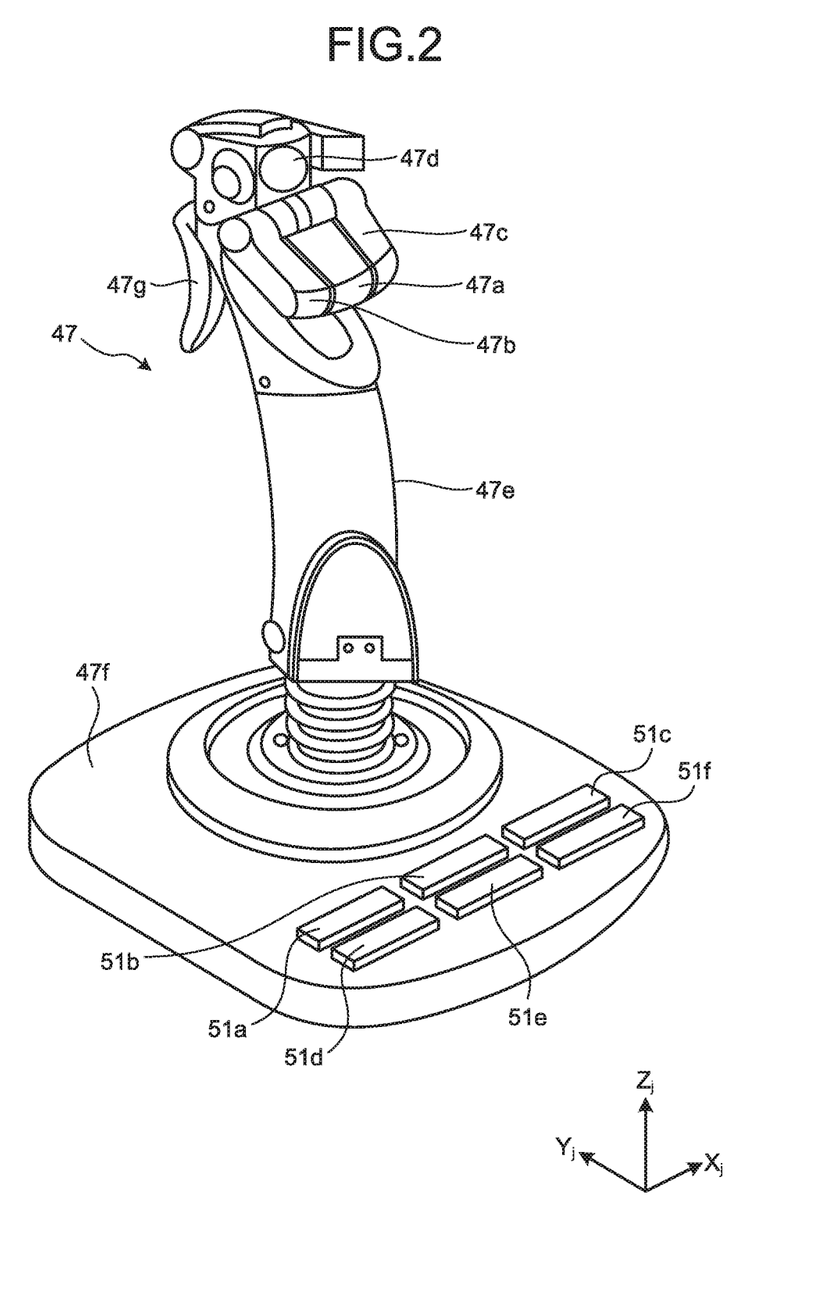
FIG. 2 is a perspective view illustrating an example of a joystick.

FIG. 2 is a perspective view illustrating an example of the joystick. As illustrated in FIG. 2, the first joystick 47 includes a base 47f, a handle 47e standing upright on the base 47f, and a plurality of first button switches 51a to 51f arranged on the base 47f. A plurality of switches 47a, 47b, and 47c are arranged side by side on an upper part of the handle 47e. A multi-directional hat switch 47d such as a four-directional or an eight-directional hat switch is arranged on a part higher than the switches 47a, 47b, and 47c. A trigger switch 47g is arranged on the opposite side of the switches 47a, 47b, and 47c.

For example, the operator can perform XY driving on the first manipulator 14 by inclining the handle 47e, and can perform Z driving on the first manipulator 14 by twisting the handle 47e. In the embodiment, a position of the first manipulator 14, that is, a distal end position of the first capillary 25 is moved in accordance with the position (the inclined direction, the inclination angle, and the twisted and rotated position) of the handle 47e. When the operator releases his/her hand from the handle 47e of the first joystick 47 while the handle 47e is inclined during an operation, the handle 47e is not automatically returned to a neutral position, and the inclination thereof is maintained. The first manipulator 14 remains at a position corresponding to the state in which the handle 47e is inclined.

In the embodiment, the "position of the manipulator" indicates a distal end position of the first capillary 25 for holding the microscopic operation target or the second capillary 35 for operating on the microscopic operation target. The "coordinates of the manipulator" indicates the distal end position of the first capillary 25 or the second capillary 35 expressed in an XYZ orthogonal coordinate system. For example, the coordinates expressed by the $X_m$ axis, the $Y_m$ axis, and the $Z_m$ axis orthogonal to one another as illustrated in FIG. 1 may be set as the coordinates of the manipulator. The "position of the handle" of the joystick includes the inclined direction, the inclination angle, and the twisted and rotated position of the handle. "The coordinates of the handle" indicates the position of the handle expressed in the XYZ orthogonal coordinate system, and coordinates expressed by the $X_j$ axis, the $Y_j$ axis, and the $Z_j$ axis orthogonal to one another as illustrated in FIG. 2 may be set as the coordinates of the handle. For example, axes orthogonal to each other in a plane parallel to a bottom face of the base 47f may be assumed to be the $X_j$ axis and the $Y_j$ axis, and an axis orthogonal to the bottom face of the base 47f may be assumed to be the $Z_j$ axis. The coordinates of the handle $(X_j, Y_j, Z_j)$ correspond to the coordinates of the manipulator $(X_m, Y_m, Z_m)$.

Various operation functions such as driving the microscope unit 12 (refer to FIG. 1) or driving the fine adjustment mechanism 44 (refer to FIG. 1) are assigned to the switches 47a, 47b, and 47c and the multi-directional hat switch 47d.

For example, regarding the first manipulator 14, when an upward direction button and a downward direction button of the multi-directional hat switch 47d are pressed, a focusing mechanism of the microscope unit 12 is driven such that focusing of the microscope 20 can be performed. When a right direction button and a left direction button are pressed, XY plane rotation and YZ plane rotation can be performed on the microscopic operation target such as a cell. The switches 47b and 47c are used for adjusting a syringe. By pressing one of the switches 47b and 47c, suction pressure (negative pressure) of the first capillary 25 by a syringe pump can be adjusted. In another example, by using the switch 47a, it is possible to cause the first manipulator 14 and the second manipulator 16 to automatically perform sequence driving.

Regarding the second manipulator 16, fine movement on the XY-plane due to motor driving can be controlled by using the multi-directional hat switch 47d. The switches 47b and 47c are used for adjusting a syringe, and the switch 47a is used for ON/OFF control of boring driving.

A position storing operation and a stored position movement operation are assigned to the first button switches 51a to 51f. The position storing operation is an operation of storing the position of the first manipulator 14, and the stored position movement operation is an operation of performing XY driving and Z driving on the first manipulator 14 such that the first manipulator 14 is moved to a manipulator stored position that has been stored. For example, by pressing the first button switch 51a, the position of the first manipulator 14 at that point in time is stored as XYZ coordinates. When the first button switch 51d is pressed after performing a predetermined operation on the microscopic operation target, the first manipulator 14 can be moved to the manipulator stored position that has been stored. Position storing operations of different positions can be assigned to the first button switches 51a, 51b, and 51c, and different stored position movement operations can be assigned to the first button switches 51d, 51e, and 51f. The first button switches 51a to 51f are provided integrally with the first joystick 47, but the embodiment is not limited thereto. The first button switches 51a to 51f may be arranged separately from the first joystick 47.

As described above, the manipulation system 10 according to the embodiment includes the first joystick 47 and the first button switches 51a to 51f, the first joystick 47 being for moving the first manipulator 14 to a position corresponding to the position of the handle 47e, and the first button switches 51a to 51f being for storing the position of the first manipulator 14 and moving the first manipulator 14 to the manipulator stored position that has been stored.

Figure 3:
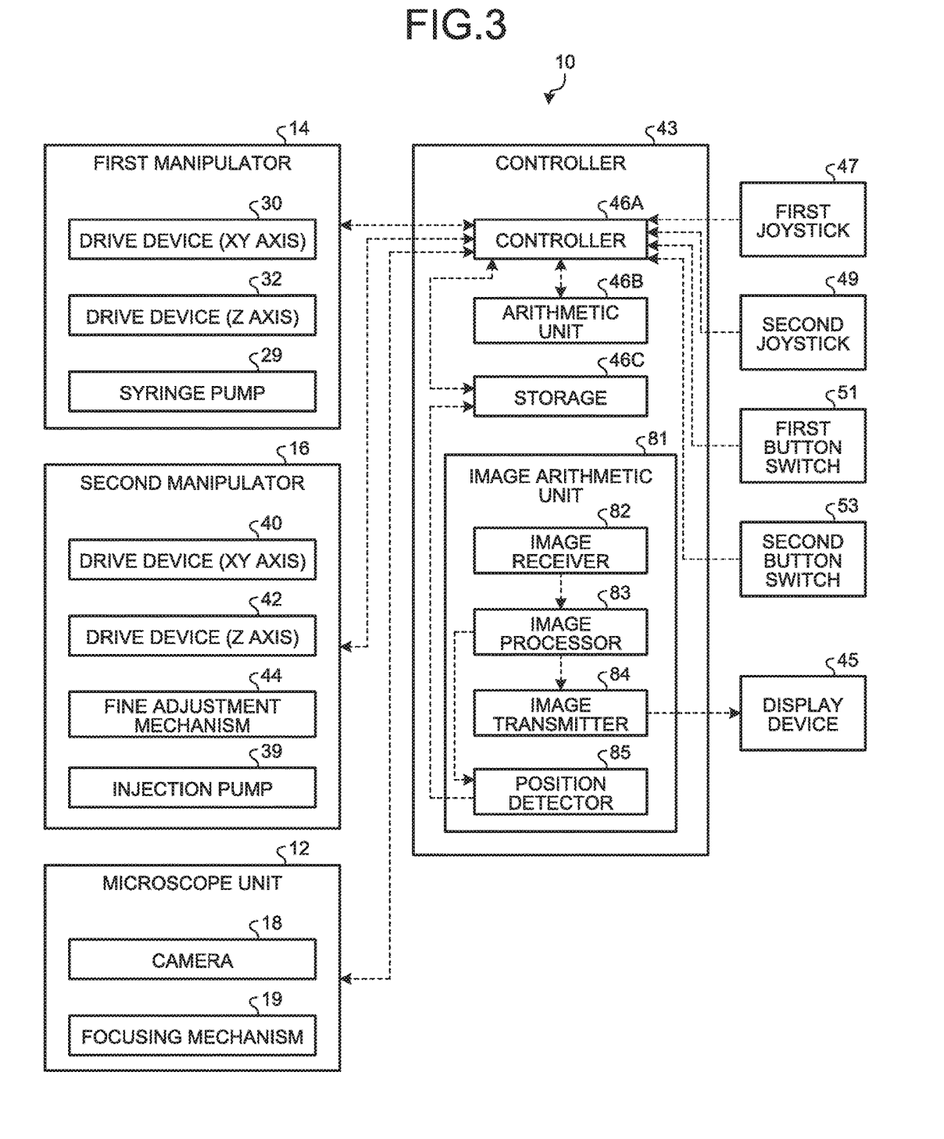
FIG. 3 is a control block diagram of the manipulation system.

Next, the following describes control performed by the controller 43 with reference to FIG. 3. FIG. 3 is a control block diagram of the manipulation system.

The controller 43 includes a controller 46A, an arithmetic unit 46B, a storage 46C, and an image arithmetic unit 81. The arithmetic unit 46B may be a central processing unit (CPU), and the storage 46C may be a hard disk, a RAM, a ROM, and the like.

When the handle 47e (refer to FIG. 2) of the first joystick 47 is operated, a first movement command signal is input from the first joystick 47 to the controller 46A. The first movement command signal is a signal for moving the first manipulator 14 to a position corresponding to the position of the handle 47e. The arithmetic unit 46B receives the first movement command signal from the controller 46A, calculates an XY drive signal and Z drive signal of the first manipulator 14, and outputs the calculated signals to the controller 46A. The controller 46A outputs the drive signals to the first manipulator 14, and performs driving control on the drive device 30 and the drive device 32. Accordingly, the first manipulator 14 is moved to a position corresponding to the position of the handle 47e.

Similarly, when the handle 49e of the second joystick 49 is operated, the controller 46A outputs the drive signals to the second manipulator 16, and performs driving control on the drive device 40 and the drive device 42. Accordingly, the second manipulator 16 is moved to a position corresponding to the position of the handle 49e of the second joystick 49.

When the first button switch 51 (for example, the first button switches 51a to 51c illustrated in FIG. 2) is operated to perform the position storing operation in which the position of the first manipulator 14 is stored, a position storing signal is input to the controller 46A. The controller 46A acquires XY coordinates from the drive device 30 of the first manipulator 14, and acquires Z coordinates from the drive device 32. The storage 46C associates the positional information of the first manipulator 14 with the operated first button switches 51a to 51c to store the positional information as XYZ coordinates.

When the first button switch 51 (for example, the first button switches 51d to 51f illustrated in FIG. 2) is operated, and the stored position movement operation is performed for moving the first manipulator 14 to the manipulator stored position stored in the storage 46C, a second movement command signal is input from the first button switch 51 to the controller 46A. The second movement command signal is a signal for moving the first manipulator 14 to the manipulator stored position stored in the storage 46C. The controller 46A acquires, from the storage 46C, the manipulator stored position corresponding to the operated first button switches 51d to 51f. The arithmetic unit 46B receives information about the manipulator stored position, calculates the XY drive signal and the Z drive signal of the first manipulator 14, and outputs the calculated drive signals to the controller 46A. The controller 46A outputs the drive signals to the first manipulator 14, and performs driving control on the drive device 30 and the drive device 32. Accordingly, the position of the first manipulator 14 is moved to the manipulator stored position corresponding to the operated first button switches 51d to 51f.

Similarly, when the second button switch 53 is operated, the position storing operation is performed for storing the position of the second manipulator 16, and the stored position movement operation is performed for moving the second manipulator 16 to the manipulator stored position stored in the storage 46C.

The controller 46A and the arithmetic unit 46B perform various controls as well as XYZ driving of the first manipulator 14 and the second manipulator 16. For example, when the switches 47a, 47b, and 47c, and the multi-directional hat switch 47d (refer to FIG. 2) are operated, the controller 46A performs control of a syringe pump 29, the fine adjustment mechanism 44, an injection pump 39, a focusing mechanism 19, and the like in accordance with functions assigned to the respective switches.

The controller 43 includes an image arithmetic unit 81 including an image receiver 82, an image processor 83, an image transmitter 84, and a position detector 85. The image receiver 82 receives an input image signal of a microscope visual field imaged by the camera 18 through the microscope 20, and the image processor 83 performs image processing on the image signal from the image receiver 82. The image transmitter 84 outputs image information before and after the image processing to a display device 45. The position detector 85 detects a position of a cell and the like as a microscopic operation target imaged by the camera 18, or a position and the like of the first capillary 25 and the second capillary 35 based on the image information after the image processing. Information about the position detected by the position detector 85 is stored in the storage 46C. Each component is controlled by the controller 46A.

Figure 4:
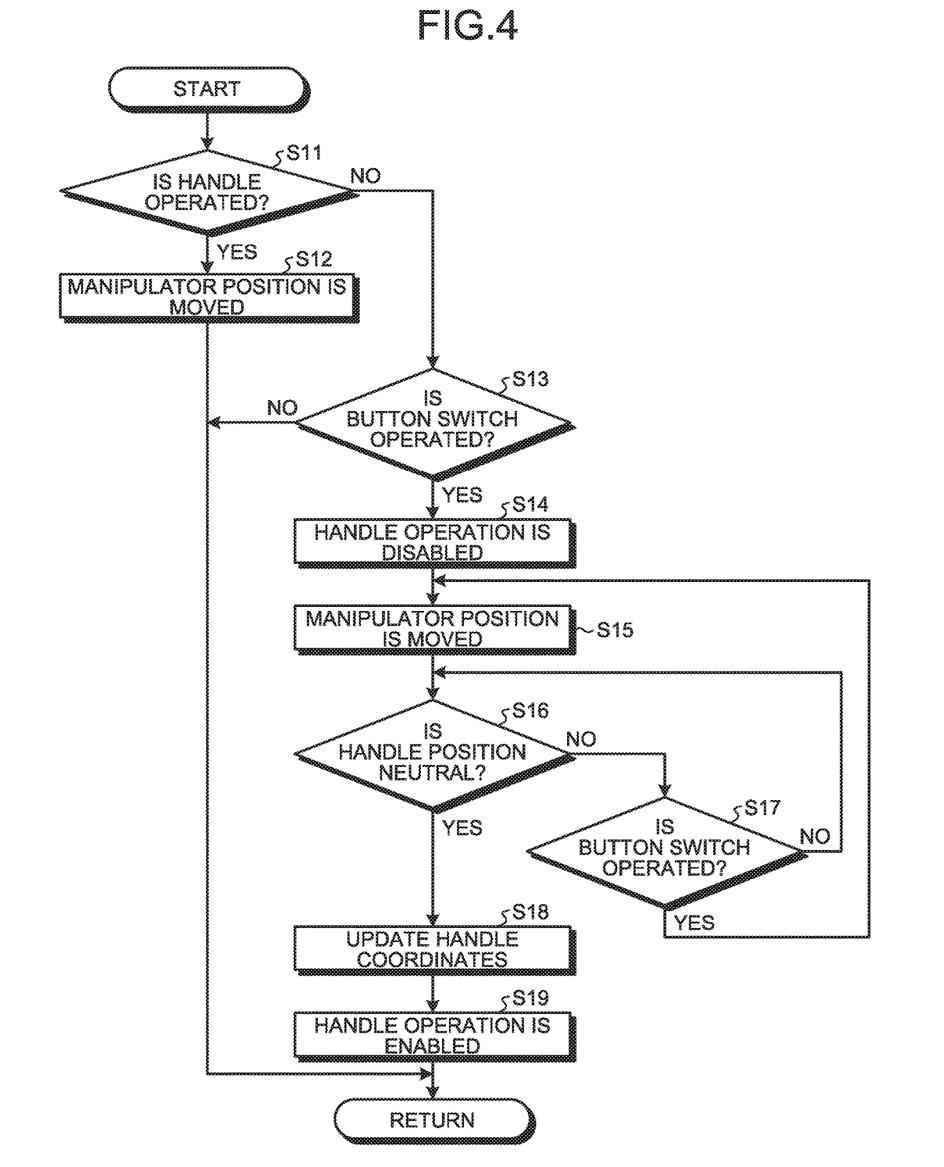
FIG. 4 is a flowchart explaining a control method of the manipulation system according to the first embodiment.
Figure 5:
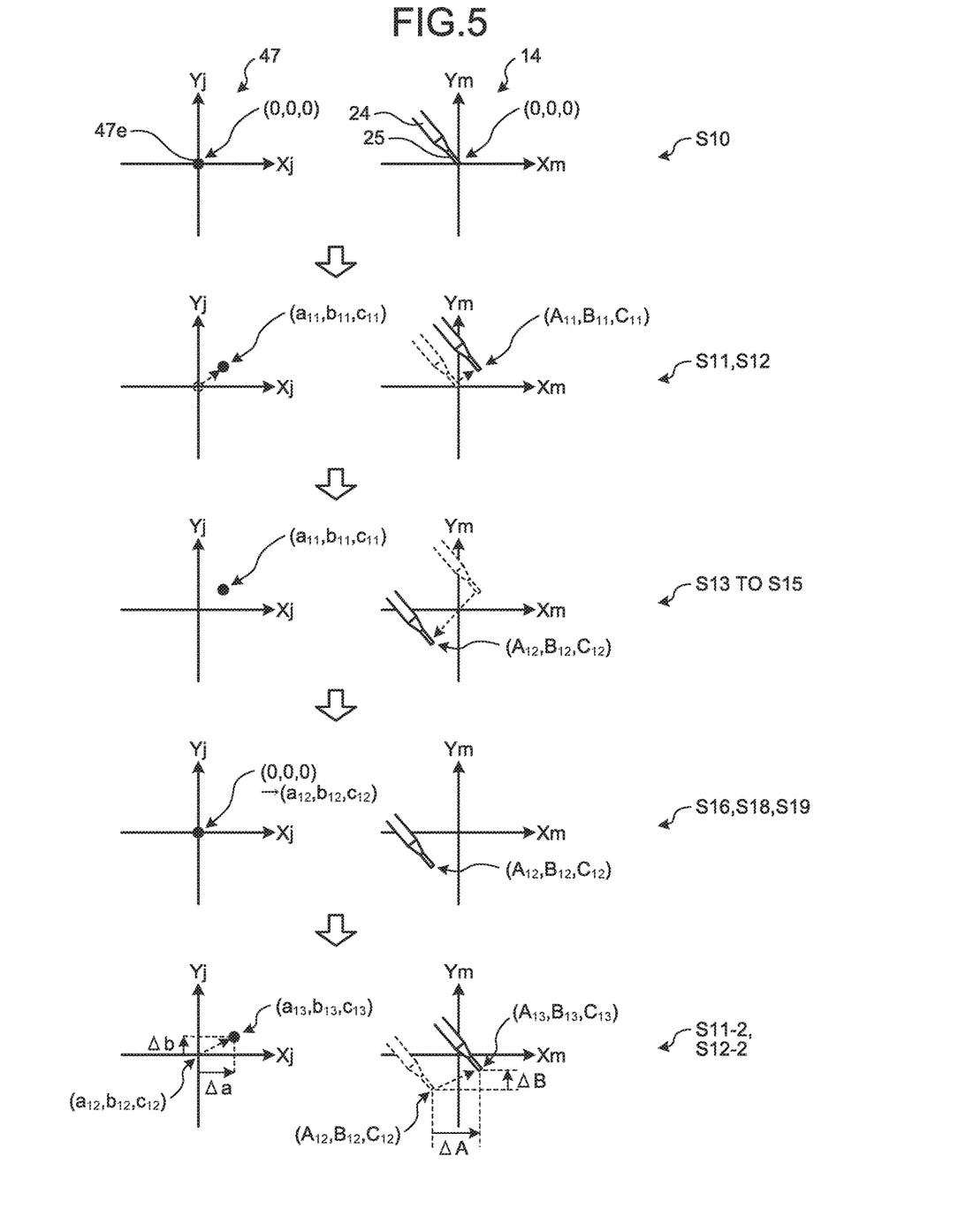
FIG. 5 is an explanatory diagram explaining a control method of the manipulation system according to the first embodiment.

Next, the following describes a control method of the manipulation system according to the embodiment. FIG. 4 is a flowchart explaining the control method of the manipulation system according to the first embodiment. FIG. 5 is an explanatory diagram explaining the control method of the manipulation system according to the first embodiment. The left figures of FIG. 5 schematically illustrate the positions of the handle 47e of the first joystick 47 in XY coordinates, and the right figures of FIG. 5 schematically illustrate the positions of the first manipulator 14 (position of the distal end of the first capillary 25 attached to the first pipette holding member 24) in XY coordinates.

In an initial state, the handle 47e of the first joystick 47 is at a neutral position, and the coordinates of the handle 47e $(X_j, Y_j, Z_j)$ are origin coordinates (0, 0, 0). The coordinates of the first manipulator 14 $(X_m, Y_m, Z_m)$ are also the origin coordinates (0, 0, 0) (FIG. 5, Step S10). In the embodiment, the "neutral position" indicates a position of the origin coordinates (0, 0, 0) at which the handle 47e in the initial state is positioned, where the position of the handle 47e is expressed in the XYZ coordinates. The "neutral position" may be coordinates (0, 0) when the position of the handle 47e is expressed in the XY coordinates.

When an input operation is performed by the handle 47e (Yes at Step S11 in FIG. 4), and the position of the handle 47e is moved to the coordinates $(X_j, Y_j, Z_j)=(a_{11}, b_{11}, c_{11})$ of the handle 47e, the first movement command signal is input from the first joystick 47 to the controller 46A. The drive device 30 and the drive device 32 are driven based on the corresponding drive signals of the controller 46A, and the first manipulator 14 is moved to manipulator coordinates $(X_m, Y_m, Z_m)=(A_{11}, B_{11}, C_{11})$ corresponding to the coordinates $(a_{11}, b_{11}, c_{11})$ of the handle 47e (Step S12).

In a state in which the handle 47e is positioned at the coordinates $(a_{11}, b_{11}, c_{11})$, if the handle 47e is not operated (No at Step S11) and the button switch is not operated (No at Step S13), the handle 47e is caused to be in a mode of waiting for an input operation in which the handle 47e is positioned at the coordinates $(a_{11}, b_{11}, c_{11})$, and the first manipulator 14 is positioned at the coordinates $(A_{11}, B_{11}, C_{11})$.

Next, when the first button switch 51 (refer to FIG. 3) is operated (Yes at Step S13), the second movement command signal is input from the first button switch 51 to the controller 46A. At this time, the controller 46A disables the input operation with the handle 47e (Step S14). That is, the controller 46A restricts output of the drive signals to the first manipulator 14 based on the first movement command signal of the first joystick 47. Accordingly, even when the operator operates the handle 47e and the position of the handle 47e is displaced from the coordinates $(a_{11}, b_{11}, c_{11})$, the controller 46A does not output the drive signals, and movement of the first manipulator 14 is restricted.

When receiving the second movement command signal from the first button switch 51, the controller 46A outputs the drive signals for moving the first manipulator 14 to the manipulator stored position, and causes the drive device 30 and the drive device 32 to be driven. The first manipulator 14 is moved to the manipulator stored position (for example, coordinates $(A_{12}, B_{12}, C_{12})$) stored in the storage 46C (Step S15). In this case, the handle 47e is positioned at the coordinates $(a_{11}, b_{11}, c_{11})$, and a correspondence relation is discontinued between the position of the handle 47e and the position of the first manipulator 14.

The controller 46A acquires information about the position of the handle 47e from the first joystick 47, and determines whether the handle position is neutral (Step S16). If the handle 47e is not at the neutral position (No at Step S16), the input operation with the handle 47e remains disabled. Assuming that the operation by the handle 47e is enabled in a state in which the correspondence relation is discontinued between the position of the first manipulator 14 and the position of the handle 47e, the first manipulator 14 is directly moved from the manipulator stored position to a position corresponding to the position of the handle 47e, and is not moved in accordance with a displacement amount of the handle 47e. Thus, movement intended by the operator does not occur, and a malfunction of the first manipulator 14 may occur. With the control method of the manipulation system 10 according to the embodiment, when the correspondence relation is discontinued between the position of the first manipulator 14 and the position of the handle 47e by the operation of the first button switch 51, movement of the first manipulator 14 caused by the operation of the handle 47e is restricted, so that malfunctions are reduced.

Even when the handle 47e is not at the neutral position, an operation other than the operation with the handle 47e can be performed, and an operation of the first button switch 51 may be performed for moving the manipulator to another manipulator stored position (Yes at Step S17).

If the handle 47e is put in the neutral position by the operation by the operator (Yes at Step S16), the controller 46A updates the coordinates of the handle 47e (Step S18). As illustrated in FIG. 5, the coordinates (0, 0, 0) of the handle 47e are replaced with coordinates $(a_{12}, b_{12}, c_{12})$ corresponding to the coordinates $(A_{12}, B_{12}, C_{12})$ of the first manipulator 14 such that the coordinates of the handle 47e are caused to correspond to the coordinates of the first manipulator 14. In this case, the coordinates of the neutral position of the handle 47e are updated to be the coordinates $(a_{12}, b_{12}, c_{12})$, and whether the handle 47e is at the neutral position is determined based on the updated coordinates $(a_{12}, b_{12}, c_{12})$.

Thereafter, the controller 46A enables movement of the first manipulator 14 by the operation of the handle 47e (Step S19). In this way, the manipulation system 10 according to the embodiment enables movement of the first manipulator 14 by the operation of the handle 47e when the handle 47e is at a predetermined input operation position. Accordingly, when the correspondence relation is discontinued between the position of the handle 47e and the position of the first manipulator 14, movement of the first manipulator 14 caused by the operation of the handle 47e is restricted, so that malfunctions of the first manipulator 14 are reduced.

Returning to Step S11 illustrated in FIG. 4, when the operator operates the handle 47e to displace the coordinates of the handle 47e in an XYZ direction by Δa, Δb, and Δc, respectively, the position of the handle 47e is moved from the coordinates $(a_{12}, b_{12}, c_{12})$ to coordinates $(a_{13}, b_{13}, c_{13})$ (FIG. 5, Step S11-2, S12-2). In this case, $a_{13}=a_{12}+\Delta a$, $b_{13}=b_{12}+\Delta b$, and $c_{13}=c_{12}+\Delta c$ are satisfied.

When receiving the first movement command signal from the first joystick 47, the controller 46A outputs the drive signals corresponding to the position of the handle 47e to the drive device 30 and the drive device 32 to move the first manipulator 14. The first manipulator 14 is moved from the coordinates $(A_{12}, B_{12}, C_{12})$ of the manipulator stored position by displacement amounts of ΔA, ΔB, and ΔC corresponding to the displacement amounts of Δa, Δb, and Δc of the handle 47e and positioned at coordinates $(A_{13}, B_{13}, C_{13})$ (FIG. 5, Step S11-2, S12-2). In this case, $A_{13}=A_{12}+\Delta A$, $B_{13}=B_{12}+\Delta B$, and $C_{13}=C_{12}+\Delta C$ are satisfied.

In the embodiment, when the handle 47e is put in the neutral position, the coordinates of the handle 47e are updated, and the coordinates of the handle 47e are caused to correspond to the coordinates of the first manipulator 14. Accordingly, even when the correspondence relation is discontinued between the position of the handle 47e and the position of the first manipulator 14, the first manipulator 14 can be moved in accordance with the displacement amount of the handle 47e, so that malfunctions of the first manipulator 14 can be reduced.

In the embodiment, the operation of the handle 47e is restarted and the coordinates of the handle 47e are updated after determining whether the handle 47e is at the neutral position, but the embodiment is not limited thereto. For example, predetermined coordinates of the handle 47e may be set for enabling restart of the operation of the handle 47e, and the display device 45 (refer to FIG. 3) may display an instruction for the operator to move the handle 47e to the coordinates.

A dead zone region is preferably set near the neutral position, that is, near the origin coordinates (0, 0, 0) in the initial state. The dead zone region is a region in which the first manipulator 14 is not moved even when the input operation position of the handle 47e is changed. In the dead zone region, even when the controller 46A receives the first movement command signal, the controller 46A does not output the drive signal, or the first joystick 47 does not output the first movement command signal. Accordingly, malfunctions caused by the first joystick 47 can be reduced. The position of the handle 47e can be easily returned to the dead zone region near the neutral position, so that an operation of enabling the operation of the handle 47e can be easily performed.

FIGS. 4 and 5 illustrate the operation of the first manipulator 14 with the first joystick 47. The operation of the second manipulator 16 with the second joystick 49 is similarly performed.

As described above, the manipulation system 10 according to the embodiment includes the first manipulator 14 operating a microscopic object, the first input unit (first joystick 47), and the second input unit (first button switch 51). The first input unit generates the first movement command signal for moving the first manipulator 14 to the manipulator position corresponding to the input operation position (position of the handle 47e), and the second input unit generates the second movement command signal for moving the first manipulator 14 to the manipulator stored position stored in the storage 46C. When the position of the handle 47e of the first joystick 47 is the predetermined input operation position, the manipulation system 10 according to the embodiment enables movement of the first manipulator 14 by the operation of the first joystick 47.

The control method of the manipulation system 10 according to the embodiment includes a first movement step (Step S12), a second movement step (Step S15), and a movement operation enabling step (Step S19). The first movement step is a step of moving the first manipulator 14 to the manipulator position corresponding to the position of the handle 47e based on the first movement command signal of the first joystick 47. The second movement step is a step of moving the first manipulator 14 to the manipulator stored position stored in the storage 46C based on the second movement command signal of the first button switch 51. The movement operation enabling step is a step of enabling the first movement step when the position of the handle 47e of the first joystick 47 is a predetermined input operation position.

With this configuration, when the position of the handle 47e of the first joystick 47 is the predetermined input operation position, the operation with the first joystick 47 is enabled. Accordingly, when the correspondence relation is discontinued between the position of the handle 47e and the position of the first manipulator 14, movement of the first manipulator 14 caused by the operation of the first joystick 47 is restricted, so that malfunctions of the first manipulator 14 can be reduced.

According to the embodiment, when the position of the handle 47e of the first joystick 47 is the predetermined input operation position (for example, the neutral position), the coordinates of the handle 47e are caused to correspond to the coordinates of the first manipulator 14. With this configuration, even when the correspondence relation is discontinued between the position of the handle 47e and the position of the first manipulator 14, the coordinates of the handle 47e can be caused to correspond to the coordinates of the first manipulator 14 at the predetermined input operation position. Accordingly, the first manipulator 14 is moved in accordance with the displacement amount of the position of the handle 47e, so that malfunctions of the first manipulator 14 can be reduced.

In the embodiment, when the first manipulator 14 is moved by the operation of the first button switch 51, movement of the first manipulator 14 by the operation of the first joystick 47 is restricted. That is, the operation with the first joystick 47 cannot be performed unless the position of the handle 47e is returned to the neutral position. With this configuration, when the first manipulator 14 is moved to the manipulator stored position by the operation of the first button switch 51, and the correspondence relation is discontinued between the position of the first manipulator 14 and the position of the handle 47e of the first joystick 47, the operation of the first joystick 47 is restricted, so that malfunctions of the first manipulator 14 are reduced.

When the position of the handle 47e is expressed in the XYZ orthogonal coordinate system, the predetermined input operation position is an origin point of the XYZ orthogonal coordinate system. With this configuration, when the operator causes the position of the handle 47e to be the neutral position, the coordinates of the handle 47e become the origin point, so that the operation with the first joystick 47 can be easily enabled.

In the embodiment, the first input unit may be the first joystick 47 that can input the input operation position corresponding to the position of the handle 47e. With this configuration, the operator can easily operate the first manipulator 14 by operating the handle 47e of the first joystick 47.

In the embodiment, the dead zone region is provided for the first joystick 47, the dead zone region being a region near the predetermined input operation position and in which the first manipulator 14 is not moved even when the input operation position of the handle 47e is changed. With this configuration, malfunctions of the first manipulator 14 are surely reduced. The handle 47e of the first joystick 47 can be easily operated to be at the predetermined input operation position, so that an operation for restarting the operation of the first manipulator 14 with the first joystick 47 can be easily performed.

Second Embodiment

Figure 6:
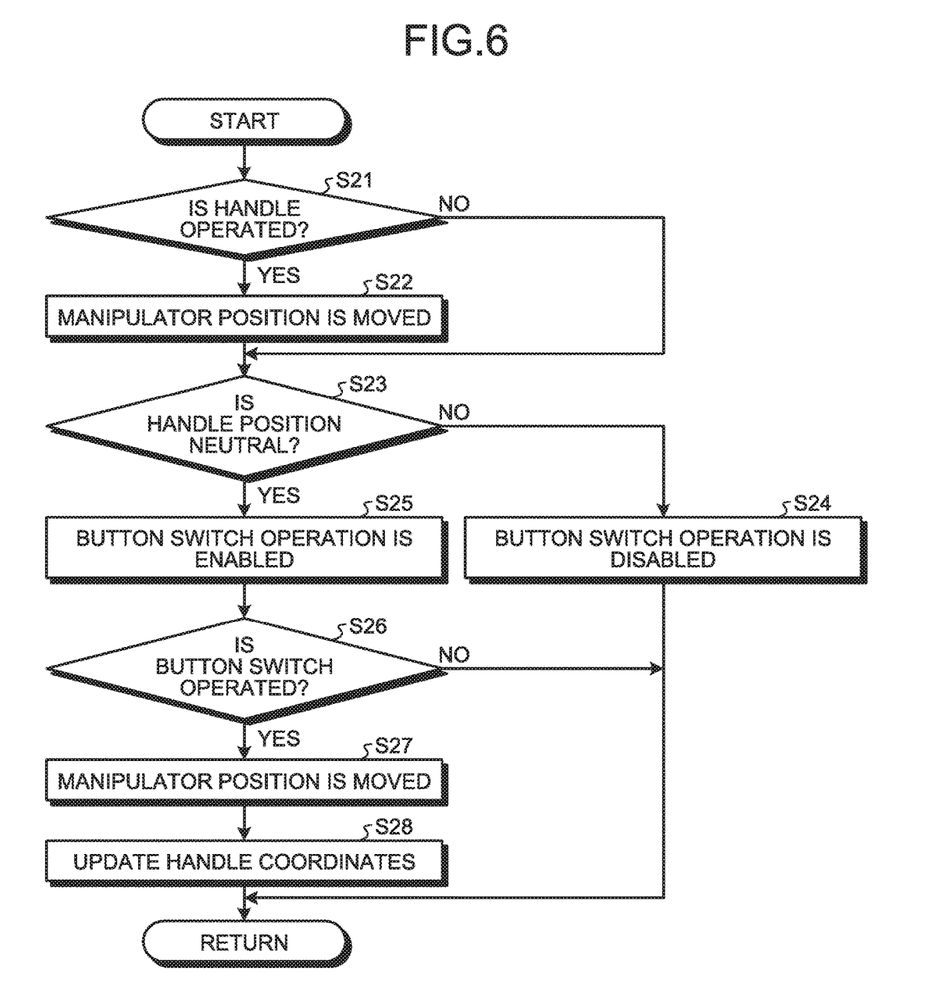
FIG. 6 is a flowchart explaining a control method of a manipulation system according to a second embodiment.
Figure 7:
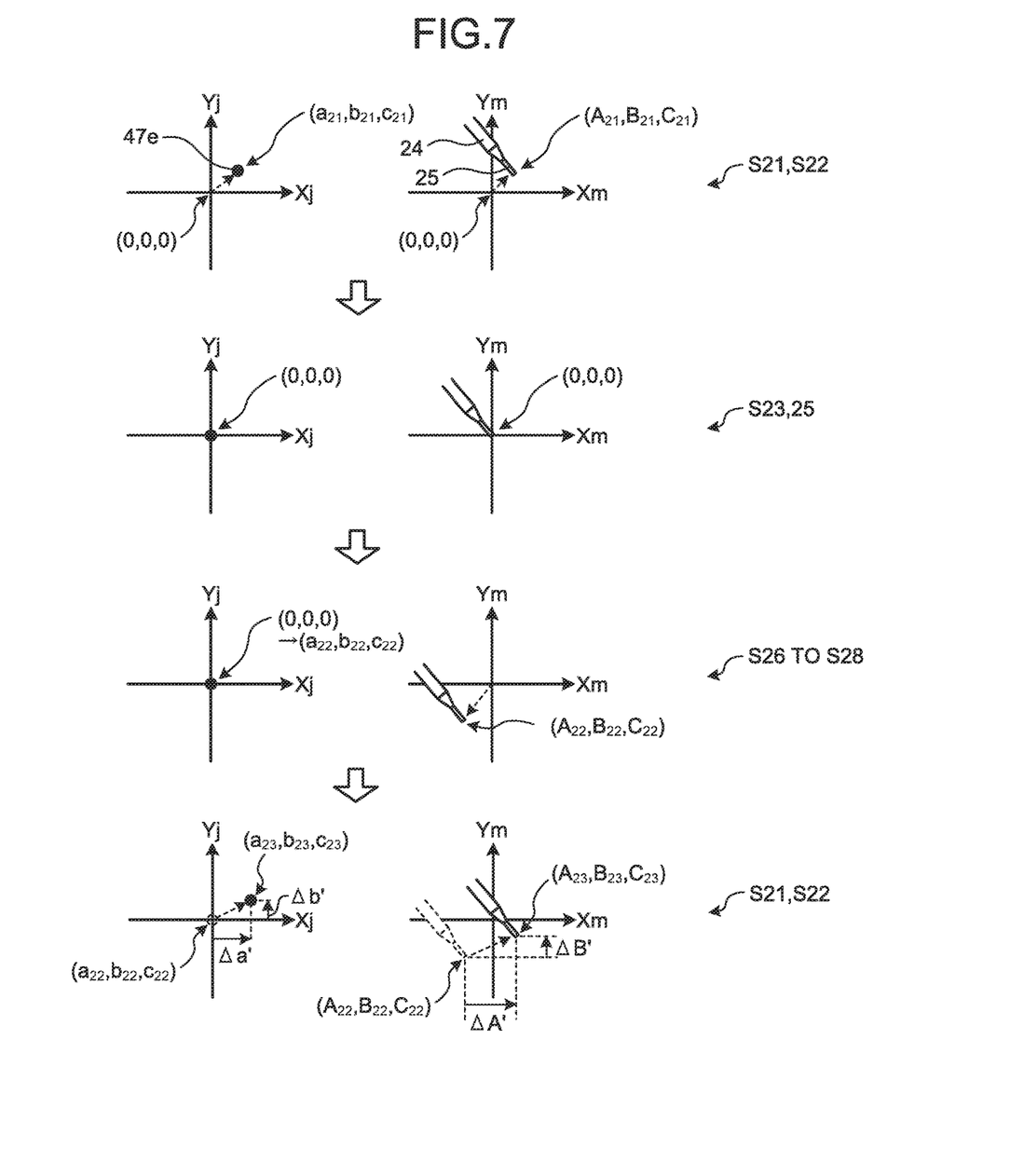
FIG. 7 is an explanatory diagram explaining a control method of the manipulation system according to the second embodiment.

FIG. 6 is a flowchart explaining a control method of the manipulation system according to a second embodiment. FIG. 7 is an explanatory diagram explaining the control method of the manipulation system according to the second embodiment. The left figures of FIG. 7 schematically illustrate the positions of the handle 47e of the first joystick 47 in XY coordinates, and the right figures of FIG. 7 schematically illustrate the positions of the first manipulator 14 in XY coordinates.

When the handle 47e is operated (Yes at Step S21), and the position of the handle 47e is moved to $(a_{21}, b_{21}, c_{21})$, the first movement command signal is input from the first joystick 47 to the controller 46A. The drive device 30 and the drive device 32 are driven based on the corresponding drive signals of the controller 46A, and the first manipulator 14 is moved to coordinates $(A_{21}, B_{21}, C_{21})$ corresponding to the coordinates $(a_{21}, b_{21}, c_{21})$ of the handle 47e (Step S22). When the handle 47e is not operated (No at Step S21), the position of the first manipulator 14 is not moved.

The controller 46A acquires information about the position of the handle 47e from the first joystick 47, and determines whether the handle position is neutral (Step S23). As illustrated in Steps S21 and S22 in FIG. 7, when the position of the handle 47e is not neutral (No at Step S23 in FIG. 6), the controller 46A disables the operation of the first button switch 51 (Step S24). That is, even when the controller 46A receives the second movement command signal from the first button switch 51, the controller 46A does not output, to the drive devices 30 and 32, the drive signals for moving the manipulator to the manipulator stored position. Alternatively, the first button switch 51 does not output the second movement command signal even when an input operation is performed.

In this way, by restricting the operation of the first button switch 51 when the position of the handle 47e is not neutral, movement of the first manipulator 14 to the manipulator stored position is restricted. This can keep the correspondence relation between the position of the handle 47e and the position of the first manipulator 14 from being discontinued, and malfunctions of the first manipulator 14 can be reduced.

Returning to Step S21 of FIG. 6, when the operator returns the position of the handle 47e to be neutral, the first joystick 47 is moved to the origin coordinates (0, 0, 0). When the position of the handle 47e is neutral (Yes at Step 23), the controller 46A enables the operation of the first button switch 51 (Step S25).

If the first button switch 51 is operated (Yes at Step S26) when the position of the handle 47e is neutral, the second movement command signal is input from the first button switch 51 to the controller 46A. When receiving the second movement command signal, the controller 46A generates the drive signals, and causes the drive device 30 and the drive device 32 to be driven. The first manipulator 14 is moved to the manipulator stored position $(A_{22}, B_{22}, C_{22})$ stored in the storage 46C (refer to FIG. 3) (Step S27). At this point, the handle 47e is neutral and positioned at the origin coordinates (0, 0, 0), so that the correspondence relation is discontinued between the position of the handle 47e and the position of the first manipulator 14. Even when the first button switch 51 can be operated, the operation may be performed with the handle 47e returning to Step S21 without operating the first button switch 51 (No at Step S26).

When the first manipulator 14 is moved based on the second movement command signal of the first button switch 51, the controller 46A updates the coordinates of the handle 47e (Step S28). That is, the coordinates (0, 0, 0) of the handle 47e are updated to coordinates $(a_{22}, b_{22}, c_{22})$ corresponding to the position of the first manipulator 14. Accordingly, the coordinates of the handle 47e are caused to correspond to the coordinates of the first manipulator 14. At this point, the coordinates of the neutral position of the handle 47e are updated to the coordinates $(a_{22}, b_{22}, c_{22})$, and whether the input operation position of the handle 47e is neutral is determined based on the updated coordinates $(a_{22}, b_{22}, c_{22})$.

Returning to Step S21 of FIG. 6, when the handle 47e is operated, and the handle 47e is displaced from the neutral position $(a_{22}, b_{22}, c_{22})$ by $\Delta a'$, $\Delta b'$, and $\Delta c'$ to be moved to coordinates $(a_{23}, b_{23}, c_{23})$, the first manipulator 14 is moved from the manipulator stored position $(A_{22}, B_{22}, C_{22})$ by displacement amounts of $\Delta A'$, $\Delta B'$, and $\Delta C'$ corresponding to the displacement amounts of $\Delta a'$, $\Delta b'$, and $\Delta c'$ of the handle 47e.

Also in the embodiment, when the handle 47e is put in the neutral position, the coordinates of the handle 47e are updated, and the coordinates of the handle 47e are caused to correspond to the coordinates of the first manipulator 14. With this configuration, even when the correspondence relation is discontinued between the position of the handle 47e and the position of the first manipulator 14, the first manipulator 14 can be moved to a position corresponding to the position of the handle 47e, so that malfunctions of the first manipulator 14 can be reduced. FIGS. 6 and 7 illustrate the operation of the first manipulator 14 with the first joystick 47. The operation of the second manipulator 16 with the second joystick 49 is similarly performed.

As described above, the manipulation system 10 according to the embodiment includes the first manipulator 14 for operating a microscopic object, the first input unit (first joystick 47), and the second input unit (first button switch 51). The first input unit generates the first movement command signal for moving the first manipulator 14 to the position corresponding to the input operation position (position of the handle 47e), and the second input unit generates the second movement command signal for moving the first manipulator 14 to the manipulator stored position stored in the storage 46C. In the manipulation system 10 according to the embodiment, when the position of the handle 47e of the first joystick 47 is the predetermined input operation position, the first manipulator 14 is enabled to be moved by the operation of the first button switch 51.

When the position of the handle 47e is not at the predetermined input operation position, movement of the first manipulator 14 by the operation of the first button switch 51 is restricted. With this configuration, movement of the first manipulator 14 to the manipulator stored position is restricted in a state in which the position of the handle 47e is not at the predetermined input operation position. This keeps the correspondence relation between the position of the first manipulator 14 and the position of the handle 47e from being discontinued, so that malfunctions of the first manipulator 14 are reduced.

In the embodiments described above, the first joystick 47 and the second joystick 49 are illustrated as the first input units, and the first button switches 51 and the second button switches 53 are illustrated as the second input units. However, the embodiment is not limited thereto. The first input unit may be an input unit such as a mouse or a switch that can move the first manipulator to a position corresponding to the input operation position. The second input unit may be a dial switch and the like that can move the first manipulator to the manipulator stored position.

The invention claimed is:

1. A control method of a manipulation system, the control method comprising:
 a first movement step of moving a manipulator to a manipulator position corresponding to an input operation position of a first input unit based on a first movement command signal of the first input unit;
 a step of restricting an operation of the first input unit when a second input unit is operated;
 a second movement step of moving, in a state where the operation of the first input unit is restricted by the operation of the second input unit, the manipulator to a manipulator stored position stored in a storage based on a second movement command signal of the second input unit; and
 a movement operation enabling step of restricting execution of the first movement step when the input operation position of the first input unit is not at a predetermined input operation position after the second movement step is executed and of enabling the first movement step when the input operation position of the first input unit is at the predetermined input operation position.

2. The control method of the manipulation system according to claim 1,
 wherein, in the movement operation enabling step, when the input operation position of the first input unit is at the predetermined input operation position, coordinates of the input operation position are caused to correspond to coordinates of the manipulator position.

3. A manipulation system comprising:
 a manipulator that operates a microscopic object;
 a first input unit that generates a first movement command signal for moving the manipulator to a manipulator position corresponding to an input operation position; and
 a second input unit that generates a second movement command signal for moving the manipulator to a manipulator stored position stored in a storage,
 wherein, when the second input unit is operated, an operation of the first input unit is restricted,
 wherein, when the input operation position of the first input unit is not at a predetermined input operation position after the manipulator is moved by the operation of the second input unit in a state where the operation of the first input unit is restricted by the operation of the second operation unit, movement of the manipulator by the operation of the first input unit is restricted, and
 when the input operation position of the first input unit is at the predetermined input operation position, the manipulator is enabled to be moved by the operation of the first input unit.

4. The manipulation system according to claim 3,
 wherein, when the input operation position of the first input unit is at the predetermined input operation position, coordinates of the input operation position are caused to correspond to coordinates of the manipulator position.

5. The manipulation system according to claim 3, further comprising:
 a controller that receives the first movement command signal or the second movement command signal and outputs a drive signal for moving the manipulator.

6. The manipulation system according to claim 3,
 wherein, when the input operation position is expressed in an XYZ orthogonal coordinate system, the predetermined input operation position is an origin point of the XYZ orthogonal coordinate system.

7. The manipulation system according to claim 3,
 wherein the first input unit is a joystick capable of inputting the input operation position by an operation of a handle.

8. The manipulation system according to claim 3,
 wherein a dead zone region is provided for the first input unit, the dead zone region being a region near the predetermined input operation position and in which the manipulator is not moved even when the input operation position is changed.

9. A control method of a manipulation system, the control method comprising:
 a first movement step of moving a manipulator to a manipulator position corresponding to an input operation position of a first input unit based on a first movement command signal of the first input unit;
 a second movement step of moving, in a state where the input operation position of the first input unit is at a predetermined input operation position, the manipulator to a manipulator stored position stored in a storage based on a second movement command signal of a second input unit; and a movement operation enabling step of restricting execution of the second movement step when the input operation position of the first input unit is not at the predetermined input operation position and of enabling the second movement step when the input operation position of the first input unit is at the predetermined input operation position.

10. The control method of the manipulation system according to claim 9,
wherein, in the movement operation enabling step, when the input operation position of the first input unit is at the predetermined input operation position, coordinates of the input operation position are caused to correspond to coordinates of the manipulator position.

11. A manipulation system comprising:
a manipulator that operates a microscopic object;
a first input unit that generates a first movement command signal for moving the manipulator to a manipulator position corresponding to an input operation position; and
a second input unit that generates a second movement command signal for moving the manipulator to a manipulator stored position stored in a storage,
wherein, when the input operation position of the first input unit is not at a predetermined input operation position, movement of the manipulator by an operation of the second input unit is restricted, and
wherein, when the input operation position of the first input unit is at the predetermined input operation position, the manipulator is enabled to be moved by the operation of the second input unit, such that, in a state where the input operation position of the first input unit is at the predetermined input operation position, the manipulator is moved by the operation of the second input unit.

12. The manipulation system according to claim 11,
wherein, when the input operation position of the first input unit is at the predetermined input operation position, coordinates of the input operation position are caused to correspond to coordinates of the manipulator position.

13. The manipulation system according to claim 11, further comprising:
a controller that receives the first movement command signal or the second movement command signal and outputs a drive signal for moving the manipulator.

14. The manipulation system according to claim 11,
wherein, when the input operation position is expressed in an XYZ orthogonal coordinate system, the predetermined input operation position is an origin point of the XYZ orthogonal coordinate system.

15. The manipulation system according to claim 11,
wherein the first input unit is a joystick capable of inputting the input operation position by an operation of a handle.

16. The manipulation system according to claim 11,
wherein a dead zone region is provided for the first input unit, the dead zone region being a region near the predetermined input operation position and in which the manipulator is not moved even when the input operation position is changed.

* * * * *